(12) United States Patent
Yamaguchi et al.

(10) Patent No.: US 11,850,891 B2
(45) Date of Patent: Dec. 26, 2023

(54) TIRE

(71) Applicant: Sumitomo Rubber Industries, Ltd., Kobe (JP)

(72) Inventors: Kazuki Yamaguchi, Kobe (JP); Mari Mishima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 83 days.

(21) Appl. No.: 17/482,007

(22) Filed: Sep. 22, 2021

(65) Prior Publication Data
US 2022/0111684 A1    Apr. 14, 2022

(30) Foreign Application Priority Data

Oct. 13, 2020 (JP) ................................ 2020-172633

(51) Int. Cl.
*B60C 11/12* (2006.01)
*B60C 11/03* (2006.01)

(52) U.S. Cl.
CPC ...... *B60C 11/1204* (2013.01); *B60C 11/1263* (2013.01); *B60C 2011/0341* (2013.01);
(Continued)

(58) Field of Classification Search
CPC . B60C 11/1263; B60C 11/1268; B60C 11/12; B60C 2011/0381;
(Continued)

(56) References Cited

U.S. PATENT DOCUMENTS

2016/0082780 A1*  3/2016  Nagahara ............. B60C 11/042
                                                    152/209.18
2016/0193884 A1*  7/2016  Takemoto ........... B60C 11/1392
                                                    152/209.1
(Continued)

FOREIGN PATENT DOCUMENTS

JP    H04-230407 A  *  8/1992
JP    2006-160055 A     6/2006
JP    2015044512 A  *  3/2015

OTHER PUBLICATIONS

JP H04-230407 Machine Translation, Yamaguchi, Wataru (Year: 1992).*
JP 2015-044512 Machine Translations, Sato, Yoshiki (Year: 2015).*

*Primary Examiner* — Cedrick S Williams
*Assistant Examiner* — Nicholas J Weiler
(74) *Attorney, Agent, or Firm* — Birch, Stewart, Kolasch & Birch, LLP

(57) ABSTRACT

A tire includes a first land portion with a ground contacting surface provided with inclined sipes inclined in a first direction to the tire axial direction. The inclined sipes include first and second inclined sipes arranged adjacently in the tire circumferential direction. Each first inclined sipe includes a first deep-bottom portion located on a first circumferential edge side, and a first shallow-bottom portion located on a second circumferential edge side and having a smaller depth than the first deep-bottom portion. Each second inclined sipe includes a second deep-bottom portion located on the second circumferential edge side, and a second shallow-bottom portion located on the first circumferential edge side and having a smaller depth than the second deep-bottom portion. Each second deep-bottom portion is arranged so as to overlap a projection region in which a respective first deep-bottom portion is expanded parallel to the tire axial direction.

17 Claims, 9 Drawing Sheets

(52) U.S. Cl.
CPC .......... *B60C 2011/0372* (2013.01); *B60C 2011/0381* (2013.01); *B60C 2011/1209* (2013.01); *B60C 2011/1213* (2013.01)

(58) Field of Classification Search
CPC ..... B60C 2011/0383; B60C 2011/0304; B60C 11/1236; B60C 11/04; B60C 2011/0386–0397
See application file for complete search history.

(56) References Cited

U.S. PATENT DOCUMENTS

2017/0232800 A1* 8/2017 Kanematsu ............. B60C 11/04
  152/209.18
2020/0139765 A1* 5/2020 Kawauchi ........... B60C 11/0306

* cited by examiner

TIRE

CROSS REFERENCE TO RELATED APPLICATION

This application claims the benefit of foreign priority to Japanese Patent Application No. JP2020-172633, filed Oct. 13, 2020, which is incorporated by reference in its entirety.

BACKGROUND ART

Field of the Disclosure

The present disclosure relates to a tire.

Description of the Related Art

The following Patent Document 1 discloses a pneumatic radial tire capable of improving performance on snow by employing specified tread pattern elements. Specifically, the tire is expected to improve cornering and braking performance on snow by employing longitudinal and lateral sipes which are connected in L-shaped manner.

Patent Document

[Patent document 1] Japanese Unexamined Patent Application Publication 2006-160055

SUMMARY OF THE DISCLOSURE

In recent years, tires that can be usable for various road conditions have been demanded, and in particular, tires having excellent steering stability on dry and performance on ice and snow have been demanded.

The present disclosure has been made in view of the above circumstances and has a major object to provide a tire capable of improving performance on ice and snow and steering stability on dry roads.

In one aspect of the present disclosure, a tire includes a tread portion comprising a plurality of circumferential grooves extending continuously in a tire circumferential direction and a first land portion divided by the circumferential grooves, the first land portion having a first circumferential edge, a second circumferential edge and a ground contacting surface therebetween, the ground contacting surface being provided with a plurality of inclined sipes inclined in a first direction with respect to a tire axial direction, the plurality of inclined sipes comprising first inclined sipes and second inclined sipes arranged adjacently in the tire circumferential direction, each of the first inclined sipes comprising a first deep-bottom portion located on the first circumferential edge side, and a first shallow-bottom portion located on the second circumferential edge side and having a smaller depth than the first deep-bottom portion, each of the second inclined sipes comprising a second deep-bottom portion located on the second circumferential edge side, and a second shallow-bottom portion located on the first circumferential edge side and having a smaller depth than the second deep-bottom portion, and each second deep-bottom portion being arranged so as to overlap a projection region in which a respective first deep-bottom portion is expanded parallel to the tire axial direction.

DESCRIPTION OF THE PREFERRED EMBODIMENTS

An embodiment of the present disclosure will be explained below with reference to the accompanying drawings.

Figure 1:
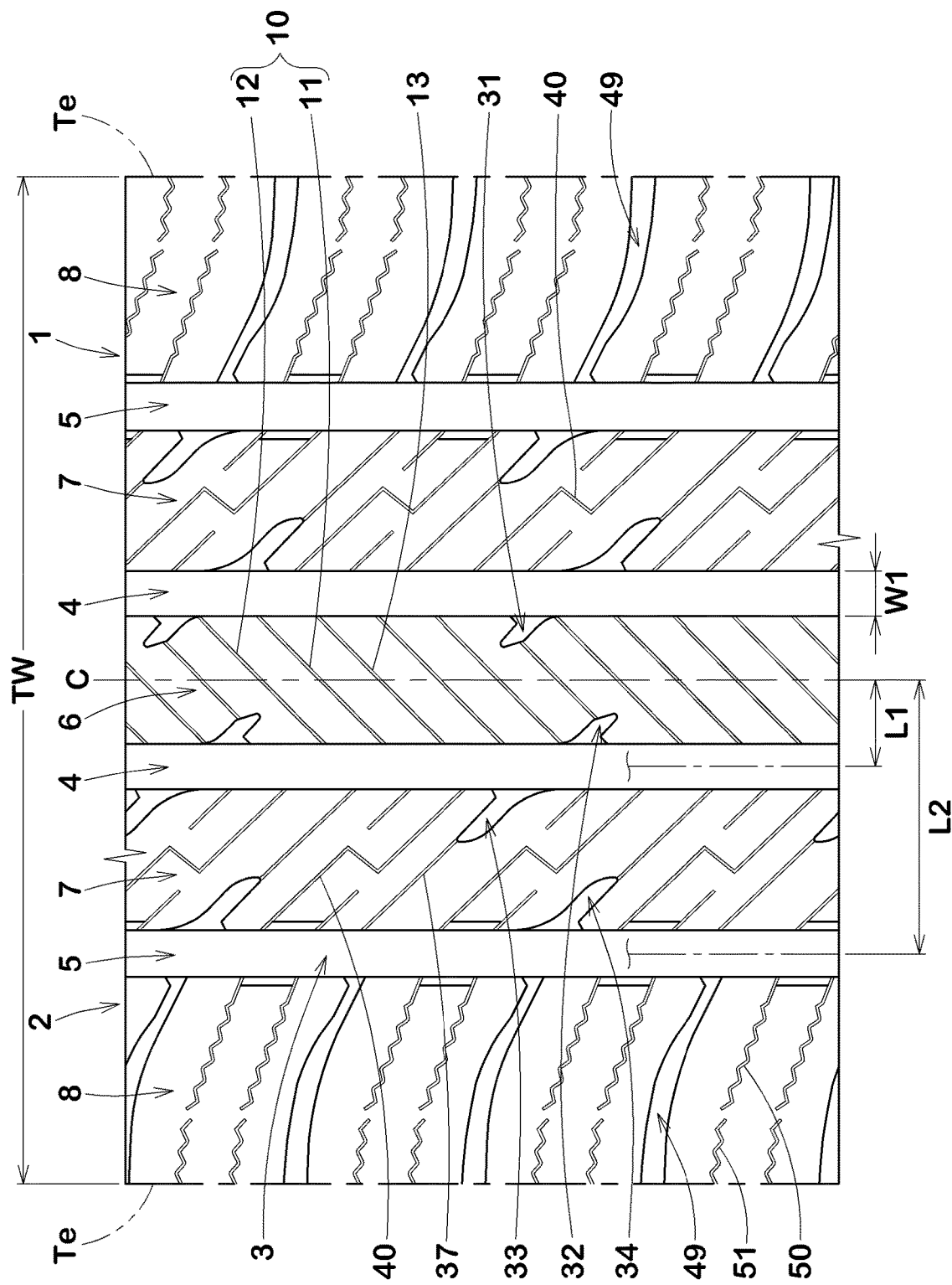
FIG. 1 is a development view of a tread portion of the tire in accordance with an embodiment of the present disclosure.

FIG. 1 is a development view of a tread portion 2 of the tire 1 in accordance with an embodiment of the present disclosure. The tire 1 according to the present embodiment is suitably used as, for example, an all-season pneumatic tire for a passenger car. However, the present disclosure is not limited to such an aspect, but may be used as a winter tire, for example.

As illustrated in FIG. 1, the tread portion 2 includes axially spaced two tread edges Te, a plurality of circumferential grooves 3 extending continuously in the tire circumferential direction between the tread edges Te, and a plurality of land portions divided by the circumferential grooves 3.

The tread edges Te are the axial outermost edges of the ground contacting patch of the tire 1 which occurs under the condition such that the tire 1 under a normal state is grounded on a plane with a standard tire load at zero camber angles.

As used herein, the "normal state" is such that the tire 1 is mounted onto a standard wheel rim with a standard pressure but loaded with no tire load. As used herein, unless otherwise noted, dimensions of portions of the tire 1 are values measured under the normal state. If a tire is not based on the above standards, or is a non-pneumatic tire, the normal state is a standard state of use according to the purpose of use of the tire, and means a state of no load.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As used herein, the "standard tire load" is a tire load officially approved for each tire by standards organizations in which the tire is based, wherein the standard tire load is the "maximum load capacity" in JATMA, the maximum value given in the above-mentioned table in TRA, and the "Load Capacity" in ETRTO, for example. If a tire is not based on the above standards, or is a non-pneumatic tire, the standard tire load refers to the load acting on the tire when the tire is under a standard mounting state. The "standard mounting state" refers to a state in which the tire is mounted on a standard vehicle according to the purpose of use of the tire, and the vehicle is stationary on a flat road surface while being able to run.

The circumferential grooves 3, for example, include two crown circumferential grooves 4 and two shoulder circumferential grooves 5.

The crown circumferential grooves 4 are arranged such that the tire equator C is arranged therebetween. The shoulder circumferential grooves 5 are arranged such that the two crown circumferential grooves 4 are arranged therebetween. A distance L1 in the tire axial direction from the tire equator C to the groove centerlines of the respective crown circumferential grooves 4 is in a range of 5% to 15% of the tread width TW, for example. A distance L2 in the tire axial direction from the tire equator C to the groove centerlines of the respective shoulder circumferential grooves 5 is in a range of 20% to 35% of the tread width TW, for example. Note that the tread width TW is an axial distance from one of the tread edges Te to the other one of the tread edges Te.

The circumferential grooves 3, for example, extend straight parallel to the tire circumferential direction. The circumferential grooves 3 may extend in a zigzag or wavy manner in the tire circumferential direction.

Preferably, the circumferential grooves 3 have a groove width W1 in a range of 3.0% to 6.0% of the tread width TW, for example. Preferably, the circumferential grooves 3 have a groove depth (not illustrated) in a range of 5.0 to 15.0 mm, for example. Note that the circumferential grooves 3 are not limited to such an aspect.

The land portions according to the present embodiment include a first land portion 6, a second land portion 7 and a third land portion 8. The first land portion 6 is defined between the two crown circumferential grooves 4, and is arranged on the tire equator C. The second land portion 7 is defined between the adjacent crown circumferential groove 4 and the shoulder circumferential groove 5. In the present embodiment, two second land portions 7 are formed and are arranged such that the first land portion 6 is located therebetween. The third land portion 8 includes one of the tread edges Te, and is defined outside in the tire axial direction of one of the shoulder circumferential grooves 5. In the present embodiment, two third land portions 8 are formed such that the first land portion 6 and two second land portions 7 are located therebetween.

Figure 2:
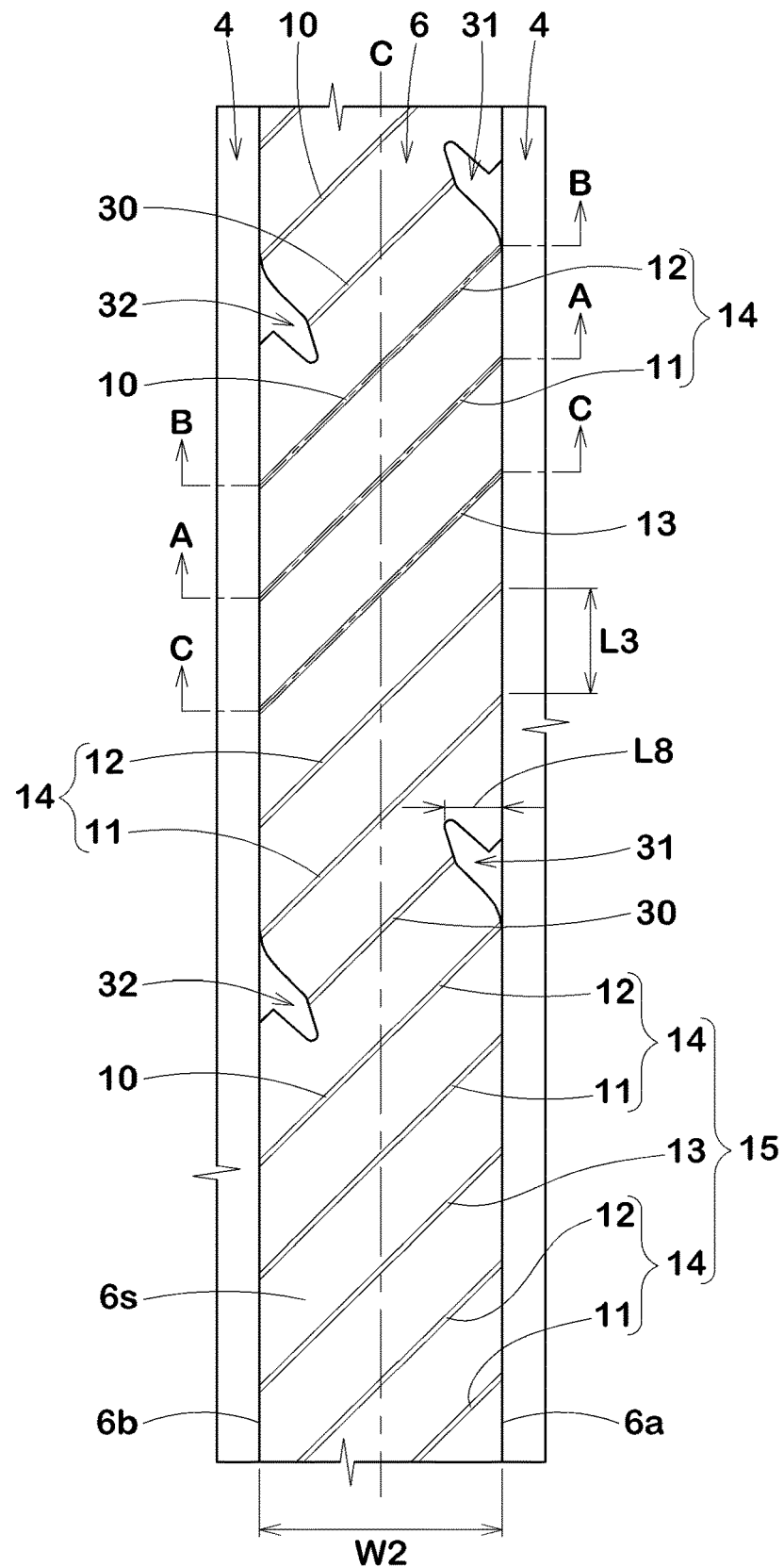
FIG. 2 is an enlarged view of a first land portion of FIG. 1.

FIG. 2 illustrates an enlarged view of the first land portion 6. As illustrated in FIG. 2, the first land portion 6 includes a first circumferential edge 6a, a second circumferential edge 6b, and a ground contacting surface 6s therebetween.

The ground contacting surface 6s of the first land portion 6 is provided with a plurality of inclined sipes 10 inclined in a first direction (in each figure of the present specification, it means upward to the right.) with respect to the tire axial direction. Further, the inclined sipes 10 include first inclined sipes 11 and second inclined sipes 12 which are arranged adjacently in the tire circumferential direction.

As used herein, "sipe" means a narrow cut element with a very small width, and the width between two sipe walls facing each other is 1.5 mm or less. Preferably, the above-mentioned width of sipe is in a range of 0.3 to 1.2 mm, more preferably 0.5 to 1.0 mm. The sipes according to the present embodiment have a width which satisfy the above-mentioned range over its entire sipe depth. Alternatively, the sipes may be provided with an opening and/or chamfer that has a width greater than the above-mentioned width, as well as a so-called flask-shape bottom portion that has a width greater than the above-mentioned width.

Figure 3:
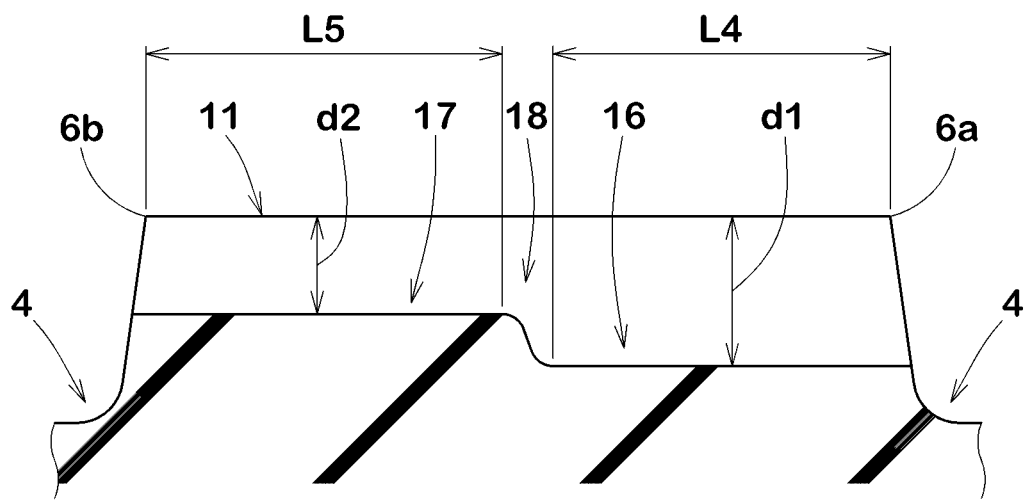
FIG. 3 is a cross-sectional view taken along the line A-A of FIG. 2.
Figure 4:
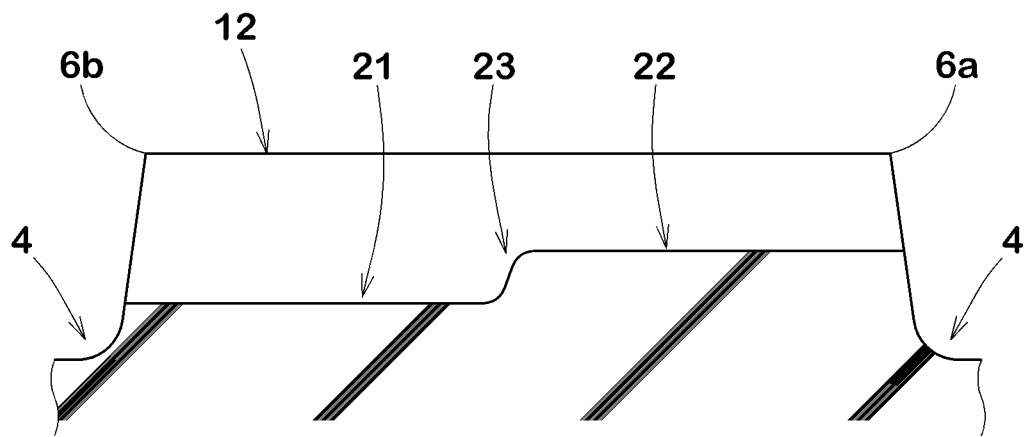
FIG. 4 is a cross-sectional view taken along the line B-B of FIG. 2.

FIG. 3 illustrates a cross-sectional view taken along the line A-A of FIG. 2, as one showing a cross-section of the first inclined sipes 11. FIG. 4 illustrates a cross-sectional view taken along the line B-B of FIG. 2, as showing a cross-section of the second inclined sipes 12. As illustrated in FIG. 3, each of the first inclined sipes 11 includes a first deep-bottom portion 16 located on the first circumferential edge 6a side, and a first shallow-bottom portion 17 located on the second circumferential edge 6b side and having a smaller depth than the first deep-bottom portion 16. As illustrated in FIG. 4, each of the second inclined sipes 12 includes a second deep-bottom portion 21 located on the second circumferential edge 6b side, and a second shallow-bottom portion 22 located on the first circumferential edge 6a side and having a smaller depth than the second deep-bottom portion 21.

Figure 5:
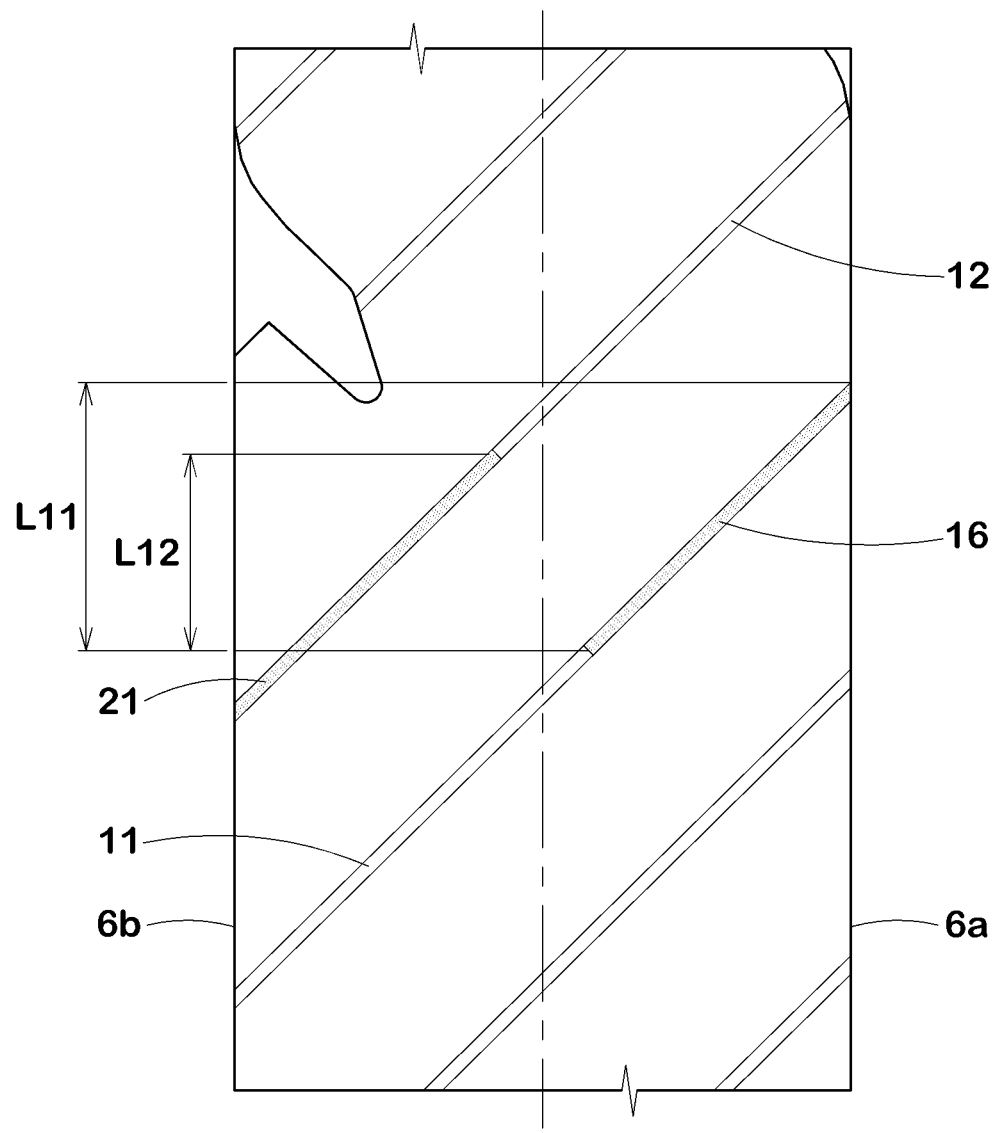
FIG. 5 is an enlarged plan view of a first inclined sipe and a second inclined sipe of FIG. 2.

FIG. 5 illustrates an enlarged plan view of one of the first inclined sipes 11 and one of the second inclined sipes 12. Note that the first deep-bottom portion 16 and the second deep-bottom portion 21, in FIG. 5, are colored so that the features of the present embodiment can be easily understood. As illustrated in FIG. 5, each second deep-bottom portion 21 is arranged so as to overlap a projection region in which a respective first deep-bottom portion 16 is expanded parallel to the tire axial direction. In the tire according to the present disclosure, by adopting the above feature, it is possible to improve performance on ice and snow and steering stability on dry roads. The reason for this is presumed to be the following mechanism.

The first inclined sipes 11 and the second inclined sipes 12 exert frictional force in the tire circumferential direction and the tire axial direction on icy and snowy roads to improve braking performance and cornering performance on icy and snowy roads. On the other hand, the arrangement of the first deep-bottom portion 16 and the first shallow-bottom portion 17 of the first inclined sipes 11, as well as the arrangement of the second deep-bottom portion 21 and the second shallow-bottom portion 22 of the second inclined sipes 12 can help to make rigidity balance uniform in the tire circumferential direction and improve straight running stability of the tire. In addition, employing a high-rigidity portion and a low-rigidity portion makes it easier to obtain a slip angle when cornering, thus being expected to result in smooth cornering. Such an action helps to improve steering stability on dry roads (hereinafter may be simply referred to as "steering stability").

Further, in the present disclosure, since each second deep-bottom portion 21 is arranged so as to overlap a projection region in which a respective first deep-bottom portion 16 is expanded parallel to the tire axial direction, the first deep-bottom portion 16 and the second deep-bottom portion 21 open together when the first inclined sipes 11 and the second inclined sipes 12 come into contact with the ground, and these edges can provide a large frictional force. This can further improve performance on ice and snow.

Hereinafter, a more detailed configuration of the present embodiment will be described. It should be noted that each configuration described below shows a more specific embodiment of the present embodiment. Thus, the present disclosure can exert the above-mentioned effects even if it does not have the configuration described below. Further, even if any one of the configurations described below is independently applied to the tire of the present disclosure having the above-mentioned features, improvement in performance can be expected according to each additional configuration. Furthermore, when some of the configurations described below are applied in combination, it can be expected that the performance based on the respective additional configuration will be improved.

As illustrated in FIG. 2, in the present embodiment, the inclined sipes 10 extend from the first circumferential edge 6a to the second circumferential edge 6b to traverse the first land portion 6 entirely. Note that they are not limited to such an aspect, and the inclined sipes 10 can terminate within the first land portion 6.

The inclined sipes 10, for example, extend straight. Thus, when a pair of sipe walls of each inclined sipe 10 comes into contact with each other, shear deformation along the length direction of the inclined sipes 10 tends to occur on the first land portion 6. Such deformation can prevent snow from clogging in the crown circumferential grooves 4 and the inclined sipes 10.

An angle of the inclined sipes 10 with respect to the tire axial direction, for example, is preferably in a range of 15 to 55 degrees, more preferably 30 to 50 degrees. When the angle of the inclined sipes 10 becomes small, a spacing between the inclined sipes 10 adjacently in the tire circumferential direction tends to be small, which helps to arrange each second deep-bottom portion 21 on the location to overlap a respective one of the projection regions of the first deep-bottom portions 16. Further, the first inclined sipes 11 are preferably inclined at an angle equal to or close to that of the second inclined sipes 12. An angle difference between the first inclined sipes 11 and the second inclined sipes 12 is preferably 10 degrees or less, more preferably 5 degrees or less. As more preferred embodiments, in the present embodiment, the first inclined sipes 11 and the second inclined sipes 12 are arranged in parallel with each other. Thus, braking performance and cornering performance on ice and snow can be improved in a well-balanced manner.

The maximum distance L3 in the tire circumferential direction between the first inclined sipes 11 and the second inclined sipes 12 which are directly adjacent in the tire circumferential direction, for example, is equal to or less than 50% of the width W2 in the tire axial direction of the first land portion 6, more preferably in a range of 20% to 45%, yet further preferably 30% to 40% of the width W2. Such an arrangement of the first inclined sipes 11 and the second inclined sipes 12 can improve steering stability and performance on ice and snow in a well-balanced manner.

As illustrated in FIG. 3, the first deep-bottom portion 16 and the first shallow-bottom portion 17 each extend at a constant depth through the entire length thereof. Each of the first inclined sipes 11 includes a first depth-changing portion 18 whose depth varies in the longitudinal direction of the sipe between the first deep-bottom portion 16 and the first shallow-bottom portion 17.

A depth d1 of the first deep-bottom portion 16, for example, is preferably in a range of 60% to 80% of the depth of the crown circumferential grooves 4. A length L4 in the tire axial direction of the first deep-bottom portion 16 is preferably in a range of 35% to 55% of the width W2 (shown in FIG. 2) in the tire axial direction of the first land portion 6.

A depth d2 of the first shallow-bottom portion 17, for example, is equal to or more than 50% of the depth d1 of the first deep-bottom portion 16, preferably in a range of 55% to 75%, more preferably 60% to 70% of the depth d1. The first shallow-bottom portion 17 can improve performance on ice and snow while maintaining sufficient rigidity of the first land portion 6.

A length L5 in the tire axial direction of the first shallow-bottom portion 17, for example, is equal to or more than 80% of the length L4 in the tire axial direction of the first deep-bottom portion 16, preferably equal to or more than 90%, but is preferably 120% or less, more preferably 110% or less of the length L4. The first deep-bottom portion 16 and the first shallow-bottom portion 17 can improve steering stability and performance on ice and snow while preventing uneven wear of the first land portion 6.

As illustrated in FIG. 4, the second deep-bottom portion 21 and the second shallow-bottom portion 22 each extend at a constant depth through the entire length thereof. Each of the second inclined sipes 12 includes a second depth-changing portion 23 whose depth varies in the longitudinal direction of the sipe between the second deep-bottom portion 21 and the second shallow-bottom portion 22. The configurations of the first deep-bottom portion 16, the first shallow-bottom portion 17 and the first depth-changing portion 18 described above can be applied to the second deep-bottom portion 21, the second shallow-bottom portion 22 and the second depth-changing portion 23, respectively. Thus, the repetitive explanation is omitted.

As illustrated in FIG. 5, a length L12 in the tire circumferential direction of an overlapping region of the first deep-bottom portion 16 and the second deep-bottom portion 21 is preferably equal to or more than 30% of the length L11 in the tire circumferential direction of the first deep-bottom portion 16, preferably 50% or more. In the present embodiment, the length L12 is in a range of 60% to 80% of the length L11. This can ensure that the above effects are exhibited.

As illustrated in FIG. 2, in the present embodiment, sipe sets 14 each including one of the first inclined sipes 11 and one of the second inclined sipes 12 are repeatedly arranged in the tire circumferential direction, and a single third inclined sipe 13 is arranged between the sipe sets 14. The configuration of the first inclined sipes 11 or the second inclined sipes 12 described above can be applied to the configuration of the third inclined sipe 13 in the tread plan view.

Figure 6:
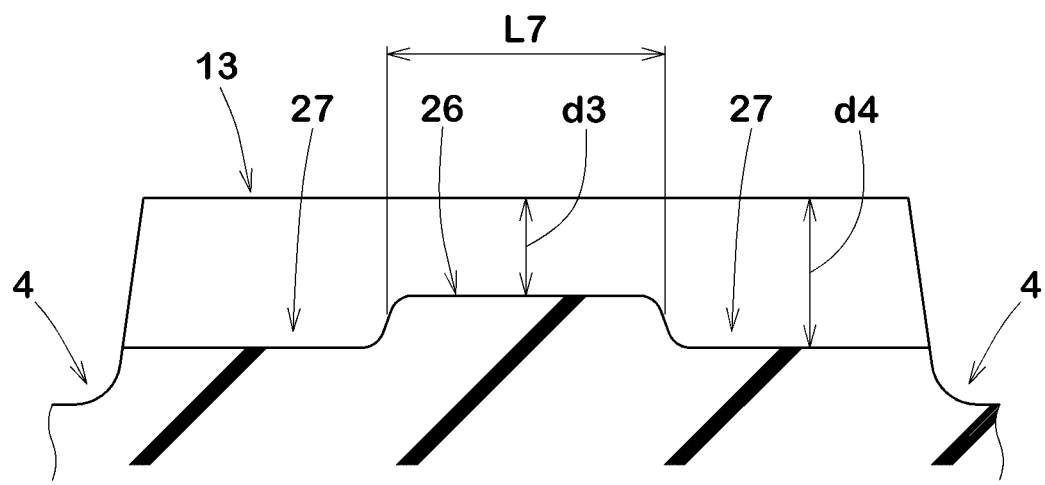
FIG. 6 is a cross-sectional view taken along the line C-C of FIG. 2.

FIG. 6 illustrates a cross-sectional view taken along the line C-C of FIG. 2. As illustrated in FIG. 6, the third inclined sipe 13 according to the present embodiment includes a middle shallow-bottom portion 26 provided on a middle region in the longitudinal direction of the sipe and a pair of outer deep-bottom portions 27 provided between the middle shallow-bottom portion 26 and the respective crown circumferential grooves 4.

The middle shallow-bottom portion 26, for example, is arranged in the middle region when the length of the third inclined sipe 13 is equally divided into three so as to include the center position of the third inclined sipe 13 in the tire axial direction. A length L7 in the tire axial direction of the middle shallow-bottom portion 26, for example, is in a range of 30% to 45% of the width W2 in the tire axial direction of the first land portion 6. The middle shallow-bottom portion 26 can suppresses excessive opening of the third inclined sipe 13, which helps to suppress uneven wear of the first land portion 6 and to improve steering stability. Note that the length L7 of the middle shallow-bottom portion 26 is measured at a center location in the height direction as shown.

A depth d3 of the middle shallow-bottom portion 26, for example, is in a range of 40% to 55% of the depth of the crown circumferential grooves 4. In the present embodiment, the middle shallow-bottom portions 26, the first shallow-bottom portions 17 and the second shallow-bottom portions 22 have the same depth as with each other. Thus, uneven wear of the first land portion 6 can further be suppressed while exhibiting the above effects.

In a tread plan view, the middle shallow-bottom portion 26 is preferably arranged on a location so as to overlap a projection region in which a respective one of the first shallow-bottom portions 17 or a respective one of the second shallow-bottom portions 22 is expanded parallel to the tire axial direction.

A depth d4 of the outer deep-bottom portions 27, for example, is in a range of 60% to 80% of the depth of the crown circumferential grooves 4. In the present embodiment, the outer deep-bottom portions 27, the first deep-bottom portions 16 and the second deep-bottom portions 21 have the same depth as with each other.

As illustrated in FIG. 2, the first land portion 6 according to the present embodiment is provided with a plurality of inclined sipe groups 15 in the tire circumferential direction. Each inclined sipe group 15 consists of five of the inclined sipes 10 which include two sipe sets 14 and one of the third inclined sipes 13 arranged between the sipe sets 14. Each sipe set 14 includes one of the first inclined sipes 11 and one of the second inclined sipes 12. Further, first short grooves 31 which extend from the first circumferential edge 6a and terminate within the first land portion 6 and second short grooves 32 which extend from the second circumferential edge and terminate within the first land portion 6 are provided. Each of the first short grooves 31 and the second short grooves 32 is arranged between the adjacent inclined sipe groups 15 in the tire circumferential direction. Furthermore, the first land portion 6 is provided with connecting sipes 30 extends from the first short grooves 31 to the second short grooves 32.

The first short grooves 31 and the second short grooves 32 are inclined in the second direction with respect to the tire axial direction. An angle of the first short grooves 31 and the second short grooves 32 with respect to the tire axial direction, for example, is in a range of 15 to 55 degrees, preferably 30 to 50 degrees. Thus, a large frictional force can be exerted on ice and snow in a direction different from that of the inclined sipes 10, and cornering performance and braking performance on ice and snow can be improved.

Each of the first short grooves 31 and the second short grooves 32, for example, terminates so as not to cross the center position in the tire axial direction of the first land portion 6. A length L8 in the tire axial direction of the first short grooves 31 and the second short grooves 32, for example, is in a range of 15% to 35% of the width W2 in the tire axial direction of the first land portion 6, more preferably 20% to 30%. Such first short grooves 31 and second short grooves 32 can improve steering stability and performance on ice and snow in a well-balanced manner.

A depth of the first short grooves 31 and the second short grooves 32, for example, is in a range of 60% to 80% of the depth of the crown circumferential grooves 4. The first short grooves 31 and the second short grooves 32 according to the present embodiment have the same depth as with the depth of the first deep-bottom portions 16.

The connecting sipes 30, for example, are inclined in the first direction with respect to the tire axial direction. An angle of the connecting sipes 30 with respect to the tire axial direction, for example, is in a range of 15 to 55 degrees, preferably 30 to 50 degrees. The connecting sipes 30 according to the present embodiment are inclined at an angle 5 degrees or less with respect to the inclined sipes 10, preferably inclined in parallel with the inclined sipes 10. The connecting sipes 30, along with the inclined sipes 10, can improve braking and cornering performance on ice and snow.

The maximum depth of the connecting sipes 30 is smaller than the maximum depth of the first deep-bottom portions 16 and the maximum depth of the second deep-bottom portions 21. A depth of the connecting sipes 30, for example, is in a range of 40% to 55% of the depth of the crown circumferential grooves 4. In the present embodiment, the depth of the connecting sipes 30 is the same as the depth of the first shallow-bottom portions 17 and the second shallow-bottom portions 22. This feature can help to suppress uneven wear of the first land portion 6.

Figure 7:
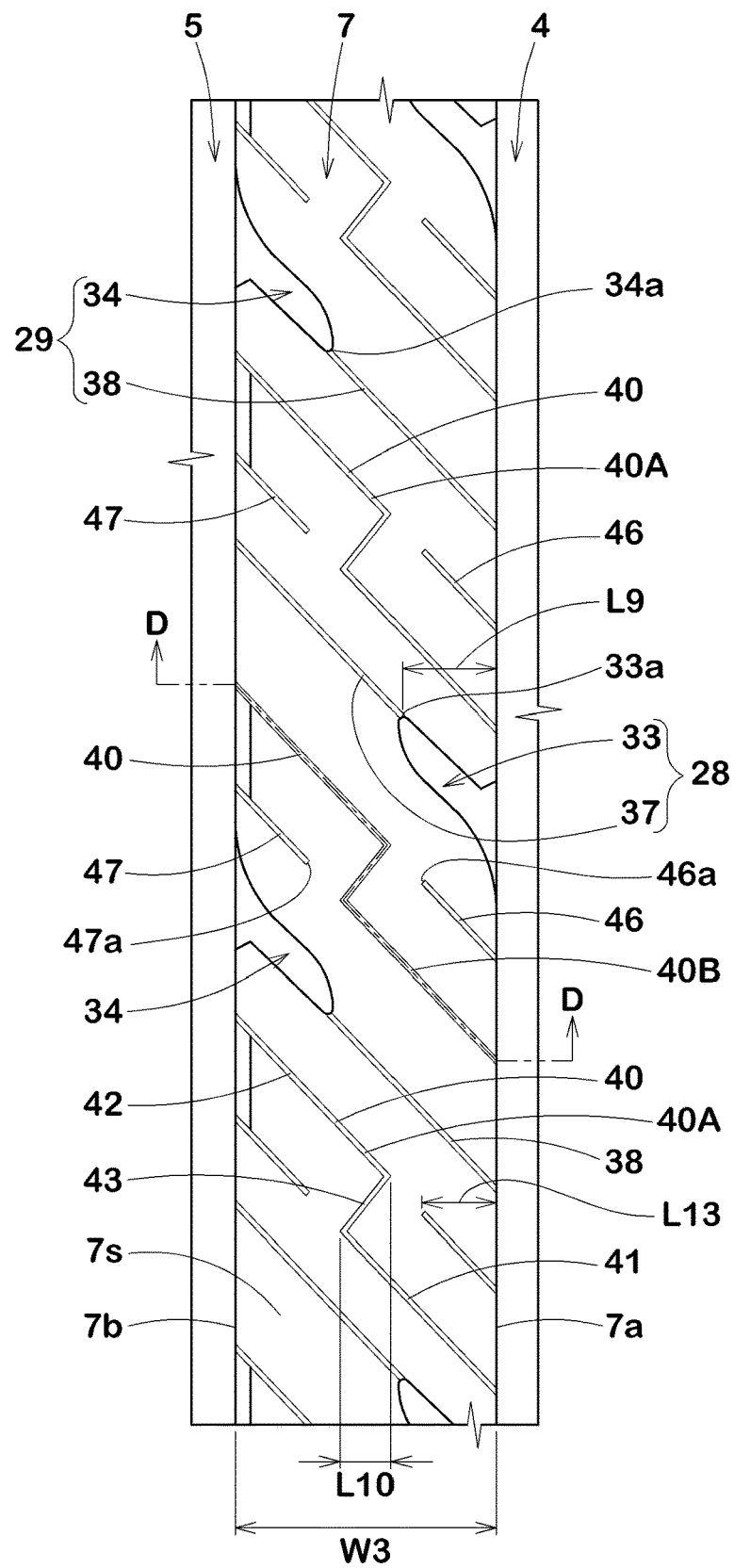
FIG. 7 is an enlarged view of a second land portion of FIG. 1.

FIG. 7 is an enlarged view of one of the second land portions 7. As illustrated in FIG. 7, the second land portion 7 has a first circumferential edge 7a, a second circumferential edge 7b, and a ground contacting surface 7s therebetween.

The ground contacting surface 7s of the second land portion 7 is provided with first blind grooves 33, second blind grooves 34, first connecting sipes 37, second connecting sipes 38, and transverse sipes 40. The first blind grooves 33 extend from the first circumferential edge 7a and have blind ends 33a within the ground contacting surface 7s. The second blind grooves 34 extend from the second circumferential edge 7b and have blind ends 34a within the ground contacting surface 7s. The first connecting sipes 37 extend from the blind ends 33a of the first blind grooves 33 to the second circumferential edge 7b. The second connecting sipes 38 extend from the blind ends 34a of the second blind grooves 34 to the first circumferential edge 7a. The transverse sipes 40 extend from the first circumferential edge 7a to the second circumferential edge 7b.

Figure 8:
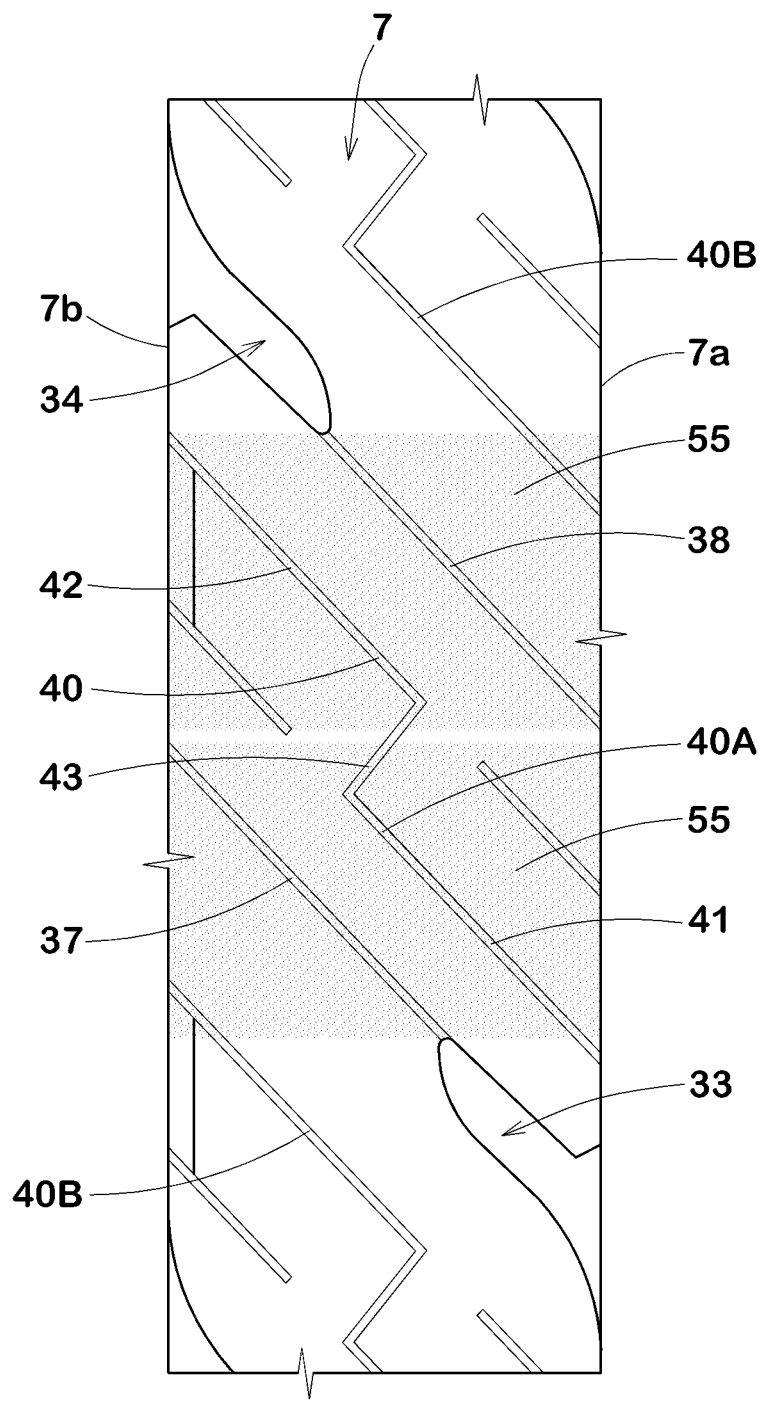
FIG. 8 is an enlarged view of transverse sipes of FIG. 7.

FIG. 8 is an enlarged view of the transverse sipes 40. As illustrated in FIG. 8, the transverse sipes 40 include first portions 41 extending from the first circumferential edge 7a with an inclination with respect to the tire axial direction, second portions 42 extending from the second circumferential edge 7b and inclined in the same direction as with the inclination of the first portions 41, and third portions 43 connecting the first portions 41 and the second portions 42 with an inclination at a different angle from that of the inclination of the first portions 41 and the second portions 42. In the present embodiment, the first portions 41 and the second portions 42, for example, are inclined in the second direction with respect to the tire axial direction, and the third portions 43 are inclined in the first direction with respect to the tire axial direction. In the present embodiment, the first blind grooves 33, the second blind grooves 34, the first connecting sipes 37 and the second connecting sipes 38 are inclined in the second direction with respect to the tire axial direction.

In a tread plan view, the first portions 41 overlap projection regions 55 (colored in FIG. 8) in which the respective first connecting sipes 37 or the respective second connecting sipes 38 are expanded parallel to the tire axial direction. The second portions 42 overlap the projection regions 55 in which the respective first connecting sipes 37 or the respective second connecting sipes 38 are expanded parallel to the tire axial direction. In the tire according to the present embodiment, by adopting the above features, it is possible to improve performance on ice and snow while suppressing a reduction of steering stability on dry roads. The reason for this is presumed to be the following mechanism.

In the present embodiment, the first blind grooves 33, the first connecting sipes 37, the second blind grooves 34 and the second connecting sipes 38 can provide edge components while suppressing the decrease in rigidity of the second land portion 7. As a result, performance on ice and snow can be improved while suppressing a reduction of steering stability on dry road surfaces.

Further, the transverse sipes 40 as described above can provide frictional force in multiple directions due to its edge components and can maintain performance on ice and snow. Furthermore, the transverse sipes 40 can prevent deformation of the land portion when the sipe walls come into contact with each other, improving braking performance on dry roads.

Furthermore, in the present embodiment, since the first portions 41 and the second portions 42 of the transverse sipes 40 overlap the projection regions 55, each sipe cooperates to provide a large frictional force in the tire axial direction and can improve cornering performance on ice and snow.

As illustrated in FIG. 7, the first blind grooves 33 and the first connecting sipes 37 have an angle of from 15 to 55 degrees, preferably 30 to 50 degrees, with respect to the tire axial direction, for example. The first blind grooves 33 and the first connecting sipes 37 can improve braking performance and cornering performance on ice and snow in a well-balanced manner.

The first blind grooves 33, for example, terminate so as not to traverse the center location in the tire axial direction of the second land portion 7. The first blind grooves 33 have a length L9 in the tire axial direction smaller than a length in the tire axial direction of the first portions 41 of the transverse sipes 40. For example, the length L9 in the tire axial direction of the first blind grooves 33 is in a range of 25% to 45% of a width W3 in the tire axial direction of the second land portion 7, preferably in a range of 30% to 40%. The first blind grooves 33 can help to improve braking performance on dry roads and performance on ice and snow in a well-balanced manner.

The first blind grooves 33 have a depth in a range of 60% to 80% of a depth of the crown circumferential grooves 4, for example. This feature can help to improve steering stability on dry roads and performance on ice and snow in a well-balanced manner.

From a similar point of view, it is preferable that the first connecting sipes 37 have a depth smaller than a depth of the first blind grooves 33. The depth of the first connecting sipes 37, for example, is in a range of 40% to 55% of the depth of the crown circumferential grooves 4.

The second blind grooves 34 have substantially the same configuration as the first blind grooves 33, and thus the above configuration of the first blind grooves 33 can be applied to the second blind grooves 34. The second connecting sipes 38 have substantially the same configuration as the first connecting sipes 37, and thus the above configuration of the first connecting sipes 37 can be applied to the second connecting sipes 38.

The transverse sipes 40 are located between the first blind grooves 33 and the second blind grooves 34. More specifically, the transverse sipes 40 are provided between a first cut elements 28 and a second cut element 29, wherein each first cut element 28 consists of one of the first blind groove 33 and one of the first connecting sipes 37 which are connected with each other, and wherein each second cut element 29 consists of one of the second blind grooves 34 and one of the second connecting sipes 38 which are connected with each other.

Each transverse sipe 40, for example, has a virtual straight line that passes both ends of the transverse sipe 40, and the virtual straight line is inclined in the second direction with respect to the tire axial direction. An angle of the first portions 41 and the second portions 42, for example, is in a range of 15 to 55 degrees, preferably 40 to 50 degrees, with respect to the tire axial direction. In the present embodiment, the angle difference between the first portions 41 and the first blind grooves 33 is equal to or less than 5 degrees, and the angle difference between the second portions 42 and the second blind grooves 34 is equal to or less than 5 degrees. As a result, uneven wear of the second land portion 7 can be suppressed.

The third portions 43, for example, extend across the center location in the tire axial direction of the second land portion 7. The third portions 43 have a length L10 in the tire axial direction in a range of 10% to 25% of the width W3 in the tire axial direction of the second land portion 7. The third portions 43, for example, have an angle in a range of 40 to 60 degrees, preferably 45 to 55 degrees, with respect to the tire axial direction.

An angle between the first portions 41 and the third portions 43, and an angle between the second portions 42 and third portions 43 are preferably equal to or more than 80 degrees, more preferably equal to or more than 90 degrees, but preferably equal to or less than 120 degrees, more preferably equal to or less than 110 degrees. Such transverse sipes 40 can prevent deformation of the second land portion 7 effectively when the sipe walls come into contact with each other, while suppressing uneven wear of the second land portion 7.

Figure 9:
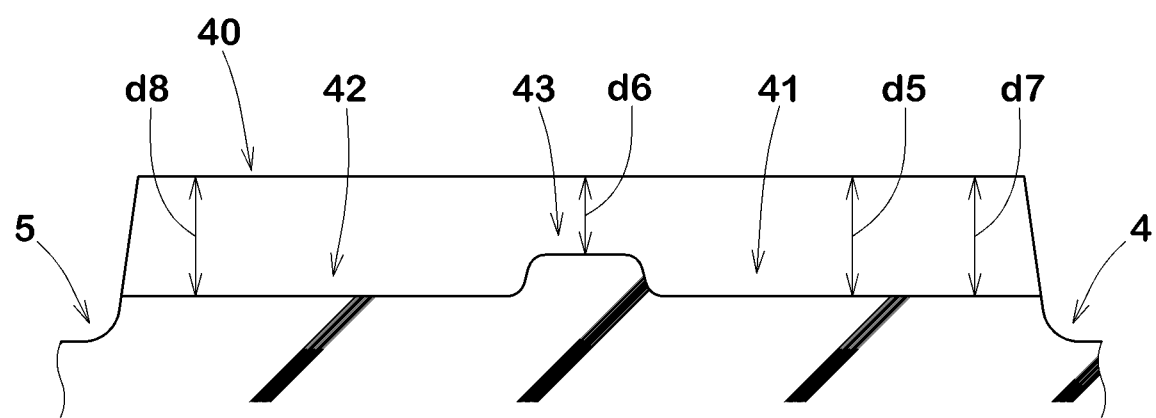
FIG. 9 is a cross-sectional view taken along the line D-D of FIG. 7.

FIG. 9 illustrates a cross-sectional view taken along the line D-D of FIG. 7. As illustrated in FIG. 9, the third portions 43 of the transverse sipes 40 have a depth d6 smaller than a depth of the first portions 41 and a depth of the second portions 42. The depth d6 of the third portions 43, for example, is in a range of 55% to 75%, more preferably 60% to 70%, of the maximum depth d5 of the transverse sipes 40. As a result, the third portions 43 can improve steering stability and performance on ice and snow while suppressing excessive opening of the transverse sipes 40 and suppressing uneven wear of the second land portion 7.

In more preferred embodiments, the maximum depth d7 of the first portions 41 is greater than the maximum depth of the first connecting sipes 37. The maximum depth d7 of the first portions 41 is preferably in a range of 140% to 160% of the maximum depth of the first connecting sipes 37. Similarly, the maximum depth d8 of the second portions 42 is preferably greater than the maximum depth of the second connecting sipes 38. The maximum depth d8 of the second portions 42 is preferably in a range of 140% to 160% of the maximum depth of the second connecting sipes 38. The edges of the first portions 41 and the second portions 42 can provide greater friction and improve performance on ice and snow.

As illustrated in FIG. 7 and FIG. 8, the transverse sipes 40 include first transverse sipes 40A and second transverse sipes 40B arranged alternately in the tire circumferential direction. In each first transverse sipe 40A, equal to or more than 50% of the length of the first portion 41 overlaps with a respective one of the projection regions 55, and equal to or more than 50% of the length of the second portion 42 overlaps with a respective one of the projection regions 55. In each second transverse sipe 40B, less than 50% of the length of the first portion 41 overlaps with a respective one of the projection regions 55, and less than 50% of the length of the second portion 42 overlaps with a respective one of the projection regions 55. These features can improve steering stability and performance on ice and snow in a well-balanced manner.

In order to ensure the above-mentioned effects, in the present embodiment, each first transverse sipe 40A overlaps a respective one of the projection regions 55 with a length preferably 60% or more, more preferably 80% or more, of the first portion 41. The same applies to the second portions 42 of the first transverse sipes 40A. In addition, each second transverse sipe 40B overlaps a respective one of the projection regions 55 with a length preferably 40% or less, more preferably 30% or less, of the first portion 41. The same applies to the second portions 42 of the second transverse sipes 40B.

As illustrated in FIG. 7, in the present embodiment, first blind sipes 46 and second blind sipes 47 are provided between the first cut elements 28 and the second cut elements 29. The first blind sipes 46 extend from the first circumferential edge 7a and have blind ends 46a within the ground contacting surface 7s. The second blind sipes 47 extend from the second circumferential edge 7b and have blind ends 47a within the ground contacting surface 7s. Such first blind sipes 46 and such second blind sipes 47 can help to improve performance on ice and snow while maintaining steering stability.

The first blind sipes 46 are located on one side of the transverse sipes 40 in the tire circumferential direction of the first portions 41, and the second blind sipes 47 are located on the other side of the transverse sipes 40 in the tire circumferential direction. The first blind sipes 46 and the second blind sipes 47, for example, are inclined in the second direction with respect to the tire axial direction. An angle of the first blind sipes 46 and the second blind sipes 47, for example, is in a range of 15 to 55 degrees with respect to the tire axial direction. The angle difference between the first blind sipes 46 and the first portions 41 of the transverse sipes 40 is equal to or less than 5 degrees, preferably 0 degrees, i.e., parallel with each other in the present embodiment. An angle difference between the second blind sipes 47 and the second portions 42 of the transverse sipes 40 is equal to or less than 5 degrees, preferably 0 degrees, i.e., parallel with each other in the present embodiment. Such first blind sipes 46 and second blind sipes 47 can improve traction and cornering performance on ice and snow in a well-balanced manner while suppressing uneven wear of the second land portion 7.

In a tread plan view, the first blind sipes 46 overlap projection regions in which the respective first portions 41 are expanded parallel to the tire axial direction. In addition, the second blind sipes 47 overlap projection regions in which the respective second portions 42 are expanded parallel to the tire axial direction. On the other hand, the second blind sipes 47 do not overlap projection regions in which the respective first blind sipes 46 are expanded parallel to the tire axial direction. Thus, the sipes can work together to provide a large amount of friction on ice and snow while maintaining sufficient rigidity of the second land portion 7.

A length in the tire axial direction of the first blind sipes 46, for example, is smaller than a length in the tire axial direction of the first portions 41 of the transverse sipes 40, and is preferably smaller than a length in the tire axial direction of the first blind grooves 33. Similarly, a length in the tire axial direction of the second blind sipes 47, for example, is smaller than a length in the tire axial direction of the second portions 42 of the transverse sipes 40, and is preferably smaller than a length in the tire axial direction of the second blind grooves 34. Specifically, the length L13 in the tire axial direction of the first blind sipes 46 or the second blind sipes 47 is in a range of 20% to 35% of the width W3 in the tire axial direction of the second land portion 7. Such first blind sipes 46 and second blind sipes 47 can maintain sufficient rigidity of the second land portion 7, improving braking performance on dry roads effectively.

In order to further improve performance on ice and snow while maintaining steering stability, the maximum depth of the first blind sipes 46 is preferably greater than the depth d6 of the third portions 43 of the transverse sipes 40, and is more preferably in a range of 90% to 110% of the maximum depth d5 of the transverse sipes 40. Further, the maximum depth of the first blind sipes 46 is smaller than the maximum depth of the first connecting sipes 37 and the maximum depth of the second connecting sipes 38.

Similarly, the maximum depth of the second blind sipes 47 is preferably greater than the depth d6 of the third portions 43 of the transverse sipes 40, and is more preferably in a range of 90% to 110% of the maximum depth d5 of the transverse sipes 40. Further, the maximum depth of the second blind sipes 47 is smaller than the maximum depth of the first connecting sipes 37 and the maximum depth of the second connecting sipes 38.

Figure 10:
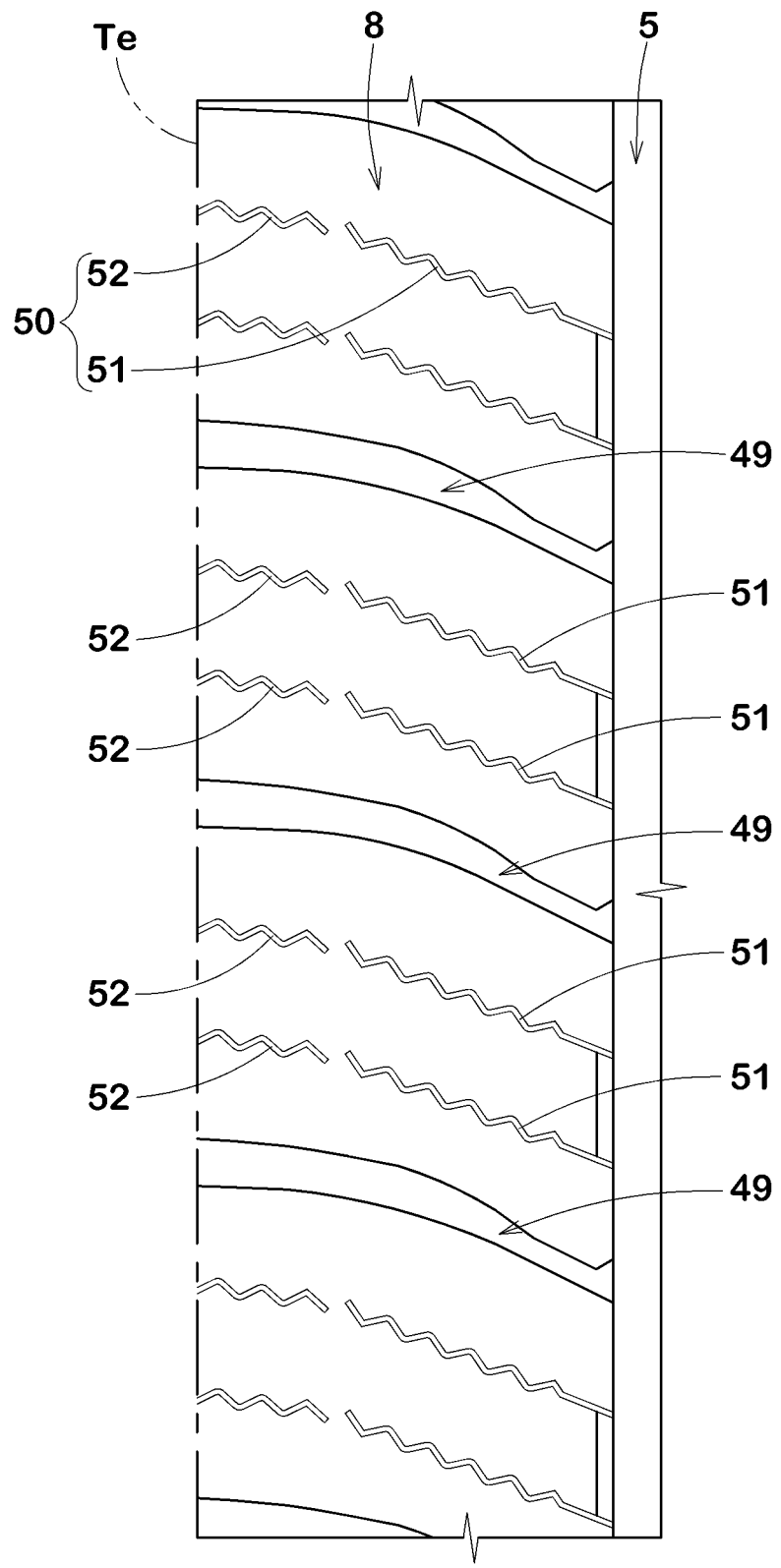
FIG. 10 is an enlarged view of a third land portion of FIG. 1.

FIG. 10 illustrates an enlarged view of one of the third land portions 8. As illustrated in FIG. 10, the third land portion 8 is provided with a plurality of lateral grooves 49 traversing the third land portion 8 and a plurality of zigzag sipes 50 extending in a zigzag manner.

The zigzag sipes 50 include first zigzag sipes 51 which extend from the shoulder circumferential groove 5 and terminate within the third land portion 8, and second zigzag sipes 52 which extend from the tread edges Te and terminate within the third land portion 8. Such first zigzag sipes 51 and second zigzag sipes 52 can increase the apparent rigidity of the third land portion 8 when the sipe walls facing each other come into contact with each other. Thus, steering stability and performance on ice and snow of the tire can be improved in a well-balanced manner.

While the particularly preferable embodiments in accordance with the present disclosure have been described in detail, the present disclosure is not limited to the illustrated embodiments, but can be modified and carried out in various aspects.

EXAMPLE

Pneumatic tire of size 215/60R16 with the basic pattern of FIG. 1 were prototyped. In each example, the first deep-bottom portions and the second deep-bottom portions are configured to have the same depth, and the first shallow-bottom portions and the second shallow-bottom portions are configured to have the same depth. As a comparative example (Ref.), a pneumatic tire having the basic pattern shown in FIG. 1 and the inclined sipes that have a constant sipe depth (5.5 mm) through the entire lengths was prototyped. Then, steering stability of each test tire on dry road, braking and cornering performance on ice and snow were tested. The common specifications and test methods for each test tire are as follows.
Rim: 16×6J
Tire inner pressure: 240 kPa
Test vehicle: front wheeled vehicle with displacement of 2400 cc
Tire location: all wheels
Braking Performance and Cornering Performance on Ice and Snow Test:
Performance when braking and turning on ice and snow was evaluated by the driver's sensuality. The test results are indicated using a score with a comparative example of 100.

The larger the value, the better the braking performance or cornering performance on ice and snow. Note that the total of the above-mentioned braking performance and cornering performance scores corresponds to the overall performance on ice and snow.

Steering Stability on Dry Road Test:

Steering stability when driving on a dry road with the above test vehicle was evaluated by the driver's sensuality. The test results are indicated using a score with the steering stability of the comparative example as 100. The larger the value, the better the steering stability on dry roads.

Tables 1 and 2 show the test results.

TABLE 1

|  | Ref. | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Depth of first and second deep-bottom portions (mm) | — | 6.6 | 5.0 | 6.0 | 7.0 | 8.0 | 6.6 | 6.6 | 6.6 | 6.6 |
| Depth of first and second shallow-bottom portions (mm) | — | 4.3 | 4.3 | 4.3 | 4.3 | 4.3 | 2.0 | 3.0 | 4.0 | 5.0 |
| Length L12 of overlapping region of first and second deep-bottom portions/ length L11 of first deep-bottom portion L11 (%) | 0 | 70 | 70 | 70 | 70 | 70 | 70 | 70 | 70 | 70 |
| Angle of inclined sipes (deg.) | 45 | 45 | 45 | 45 | 45 | 45 | 45 | 45 | 45 | 45 |
| Braking performance on ice and snow (score) | 100 | 110 | 105 | 108 | 110 | 112 | 106 | 109 | 110 | 111 |
| Cornering performance on ice and snow (score) | 100 | 108 | 104 | 106 | 108 | 109 | 105 | 107 | 108 | 109 |
| Steering stability on dry (score) | 100 | 103 | 104 | 103 | 101 | 100 | 104 | 103 | 102 | 101 |

TABLE 2

|  | Ex. 10 | Ex. 11 | Ex. 12 | Ex. 13 | Ex. 14 | Ex. 15 | Ex. 16 | Ex. 17 |
| --- | --- | --- | --- | --- | --- | --- | --- | --- |
| Depth of first and second deep-bottom portions (mm) | 6.6 | 6.6 | 6.6 | 6.6 | 6.6 | 6.6 | 6.6 | 6.6 |
| Depth of first and second shallow-bottom portions (mm) | 4.3 | 4.3 | 4.3 | 4.3 | 4.3 | 4.3 | 4.3 | 4.3 |
| Length L12 of overlapping region of first and second deep-bottom portions/ length L11 of first deep-bottom portion L11 (%) | 30 | 50 | 60 | 80 | 70 | 70 | 70 | 70 |
| Angle of inclined sipes (deg.) | 45 | 45 | 45 | 45 | 35 | 40 | 50 | 55 |
| Braking performance on ice and snow (score) | 105 | 108 | 110 | 111 | 112 | 110 | 108 | 105 |
| Cornering performance on ice and snow (score) | 103 | 105 | 108 | 108 | 104 | 106 | 109 | 111 |
| Steering stability on dry (score) | 103 | 103 | 103 | 101 | 104 | 103 | 103 | 101 |

From the test results, it was confirmed that the example tires improved performance on ice and snow while suppressing the deterioration of the steering stability on a dry road.

The following clauses are disclosed regarding the above-described embodiments.

[Clause 1]

A tire comprising:

a tread portion comprising a plurality of circumferential grooves extending continuously in a tire circumferential direction and a first land portion divided by the circumferential grooves, the first land portion having a first circumferential edge, a second circumferential edge and a ground contacting surface therebetween, the ground contacting surface being provided with a plurality of inclined sipes inclined in a first direction with respect to a tire axial direction, the plurality of inclined sipes comprising first inclined sipes and second inclined sipes arranged adjacently in the tire circumferential direction, each of the first inclined sipes comprising a first deep-bottom portion located on the first circumferential edge side, and a first shallow-bottom portion located on the second circumferential edge side and having a smaller depth than the first deep-bottom portion, each of the second inclined sipes comprising a second deep-bottom portion located on the second circumferential edge side, and a second shallow-bottom portion located on the first circumferential edge side and having a smaller depth than the second deep-bottom portion, and each second deep-bottom portion being arranged so as to overlap a projection region in which a respective first deep-bottom portion is expanded parallel to the tire axial direction.

[Clause 2]

The tire according to clause 1, wherein the first land portion is arranged on a tire equator.

[Clause 3]

The tire according to clause 1 or 2, wherein an angle of the inclined sipes with respect to the tire axial direction is in a range of 15 to 55 degrees.

[Clause 4]

The tire according to any one of clauses 1 to 3, wherein the inclined sipes extend from the first circumferential edge to the second circumferential edge.

[Clause 5]
The tire according to any one of clauses 1 to 4,
the first land portion being further provided with
first short grooves extending from the first circumferential edge and terminating within the first land portion, and
second short grooves extending from the second circumferential edge and terminating within the first land portion.

[Clause 6]
The tire according to any one of clauses 1 to 5, wherein
the first short grooves and the second short grooves are inclined in a second direction opposite to the first direction with respect to the tire axial direction.

[Clause 7]
The tire according to any one of clauses 1 to 6,
the first land portion being further provided with
first short grooves extending from the first circumferential edge and terminating within the first land portion,
second short grooves extending from the second circumferential edge and terminating within the first land portion, and
connecting sipes extending from the first short grooves to the second short grooves.

[Clause 8]
The tire according to clause 7, wherein
a maximum depth of the connecting sipes is smaller than a maximum depth of the first deep-bottom portions and a maximum depth of the second deep-bottom portions.

[Clause 9]
The tire according to any one of clauses 1 to 9,
the tread portion further comprising a second land portion adjacent to the first land portion, the second land portion having a first circumferential edge, a second circumferential edge and a ground contacting surface therebetween, wherein
the ground contacting surface of the second land portion is provided with a plurality of transverse sipes extending from the first circumferential edge to the second circumferential edge.

[Clause 10]
The tire according to clause 9, wherein
the plurality of transverse sipes comprises
first portions extending from the first circumferential edge and being inclined in a second direction opposite to the first direction,
second portions extending from the second circumferential edge and being inclined in the second direction, and
third portions connecting the first portions and the second portions and being inclined in the first direction.

What is claimed is:

1. A tire comprising:
a tread portion comprising a plurality of circumferential grooves extending continuously in a tire circumferential direction and a first land portion divided by the circumferential grooves,
the first land portion having a first circumferential edge, a second circumferential edge and a ground contacting surface therebetween,
the ground contacting surface being provided with a plurality of inclined sipes inclined in a first direction with respect to a tire axial direction,
the plurality of inclined sipes comprising first inclined sipes and second inclined sipes arranged adjacently in the tire circumferential direction,
each of the first inclined sipes comprising a first deep-bottom portion located on the first circumferential edge side, and a first shallow-bottom portion located on the second circumferential edge side and having a smaller depth than the first deep-bottom portion,
each of the second inclined sipes comprising a second deep-bottom portion located on the second circumferential edge side, and a second shallow-bottom portion located on the first circumferential edge side and having a smaller depth than the second deep-bottom portion, and
each second deep-bottom portion being arranged so as to overlap a projection region in which a respective first deep-bottom portion is expanded parallel to the tire axial direction,
wherein the first land portion further comprises
first short grooves extending from the first circumferential edge and terminating within the first land portion,
second short grooves extending from the second circumferential edge and terminating within the first land portion, and
connecting sipes extending from the first short grooves to the second short grooves,
wherein a maximum depth of the connecting sipes is smaller than a maximum depth of the first deep-bottom portions and a maximum depth of the second deep-bottom portions.

2. The tire according to claim 1, wherein the first land portion is arranged on a tire equator.

3. The tire according to claim 1, wherein an angle of the inclined sipes with respect to the tire axial direction is in a range of 15 to 55 degrees.

4. The tire according to claim 1, wherein the inclined sipes extend from the first circumferential edge to the second circumferential edge.

5. The tire according to claim 1, wherein the first short grooves and the second short grooves are inclined in a second direction opposite to the first direction with respect to the tire axial direction.

6. The tire according to claim 1, wherein
the tread portion further comprises a second land portion adjacent to the first land portion, the second land portion having a first circumferential edge, a second circumferential edge and a ground contacting surface therebetween, and
the ground contacting surface of the second land portion is provided with a plurality of transverse sipes extending from the first circumferential edge to the second circumferential edge.

7. The tire according to claim 6, wherein the plurality of transverse sipes comprises
first portions extending from the first circumferential edge and being inclined in a second direction opposite to the first direction,
second portions extending from the second circumferential edge and being inclined in the second direction, and
third portions connecting the first portions and the second portions and being inclined in the first direction.

8. The tire according to claim 1, wherein the inclined sipes each extend straight over an entire length thereof.

9. The tire according to claim 1, wherein the inclined sipes are inclined at an angle of from 30 to 50 degrees with respect to the tire axial direction.

10. The tire according to claim 1, wherein the first inclined sipes and the second inclined sipes extend in parallel with each other over entire lengths thereof.

11. The tire according to claim 1, wherein the connecting sipes, the first inclined sipes and the second inclined sipes extend in parallel with each other.

12. The tire according to claim 1, wherein
the inclined sipes comprise third inclined sipes, and
each third inclined sipe comprises a middle shallow-bottom portion provided on a middle region in a longitudinal direction of the third inclined sipe and a pair of outer deep-bottom portions located on both sides of the middle shallow-bottom portion.

13. The tire according to claim 12, wherein the middle shallow-bottom portions, the first shallow-bottom portions and the second shallow-bottom portions have the same depth as each other.

14. The tire according to claim 13, wherein the outer deep-bottom portions, the first deep-bottom portions and the second deep-bottom portions have the same depth as each other.

15. The tire according to claim 14, wherein the first land portion is not provided with any sipes that are inclined in a second direction opposite to the first direction with respect to the tire axial direction.

16. The tire according to claim 12, wherein the outer deep-bottom portions, the first deep-bottom portions and the second deep-bottom portions have the same depth as each other.

17. The tire according to claim 1, wherein the first land portion is not provided with any sipes that are inclined in a second direction opposite to the first direction with respect to the tire axial direction.

* * * * *